May 6, 1969 D. B. MOLLMAN 3,443,257

MOUNTED TOROIDAL ELECTRICAL COMPONENT

Filed June 8, 1967

INVENTOR.
DONALD B. MOLLMAN

BY Gary M. Gron
ATTORNEY

United States Patent Office 3,443,257
Patented May 6, 1969

3,443,257
MOUNTED TOROIDAL ELECTRICAL COMPONENT
Donald B. Mollman, Mason, Ohio, assignor to General Electric Company, a corporation of New York
Filed June 8, 1967, Ser. No. 644,563
Int. Cl. H01f *27/30*
U.S. Cl. 336—199 7 Claims

ABSTRACT OF THE DISCLOSURE

A toroidal electrical component such as a toroidal magnetic core having relatively thin winding leads mounted on a support apparatus. The support apparatus comprises a center body of electrically insulating material disposed in the center of the toroidal component and secured thereto by suitable means. A plurality of relatively thicker interconnecting wires extend through the center body and from both ends thereof in spaced apart relationship. In this manner, the wires extending from one end of the center body may be connected to the relatively thin winding wires of the toroidal magnetic core by soldering or welding and the wires from the opposite end may be connected to an electrical circuit. This arrangement holds the interconnecting wires and the relatively thin winding wires of the toroidal magnetic core in rigid relationship to prevent breakage during connection of the electrical component into an electrical circuit.

The present invention relates to support apparatus for electrical components and more particularly to support apparatus for toroidal electrical components.

The use of toroidal electrical components in miniaturized electronic circuits is well known. Generally, these toroidal magnetic cores are wound with relatively thin wires having thin insulating coatings thereon. When the winding leads from the toroidal core are connected to an electrical circuit, such as a printed circuit, there are a number of problems that arise.

It has been the practice in connecting toroidal electrical components to a printed circuit to merely pass the magnetic winding wires through appropriate holes in the circuit board, strip the insulation of the ends and connect the leads to the electrically conductive portion of the printed circuit. However, this approach poses a substantial problem in that the openings in the printed circuit board through which the wires are passed must be approximately the size of the wire to permit an effective electrical connection to the printed circuit. This poses substantial assembly problems in trying to guide the fine winding wires through the relatively small holes in the circuit board.

In order to somewhat alleviate this problem, it is now the practice to secure larger interconnecting wires to the thin winding wires of the toroidal electrical component and join the interconnecting wires to the circuit. While enabling easier connection of the leads with the circuit, these are difficulties encountered during assembly of the electrical component to the circuit. The connections between the interconnecting and winding wires are subjected to frequent bending during assembly which may tend to impair the electrical continuity of the joint. In addition, the ends of the winding wires are difficult to hold for making the connection between the winding wires and the interconnecting wires.

Accordingly, it is an object of the present invention to provide effective, economical and simplified connection of the relatively thin leads of a toroidal electrical component with an electrical circuit.

The above ends are achieved by providing support apparatus for a toroidal electrical component having relatively thin electrical wires. The support apparatus comprises a center body of electrically insulating material disposed in the center of the toroidal component. A means are provided for securing the toroidal electrical component to the center body. A plurality of relatively thicker electrically conductive interconnecting wires extend through the center body and from both ends thereof in spaced apart relationship so that the interconnecting wires extending from one end of the center body may be connected to the relatively thin wires of the toroidal element and the wires from the opposite end may be connected to an electrical circuit. As a result, the interconnecting relatively thin wires of the toroidal element electrical component are rigidly mounted relative to one another which greatly facilitates connection of the toroidal electrical component to an electrical circuit.

The above and other related objects and features of the present invention will be apparent from a reading of the description of the disclosure found in the accompanying drawings and the novelty thereof pointed out in the appended claims.

Figures 1, 2, 3, 4, 5, 6:
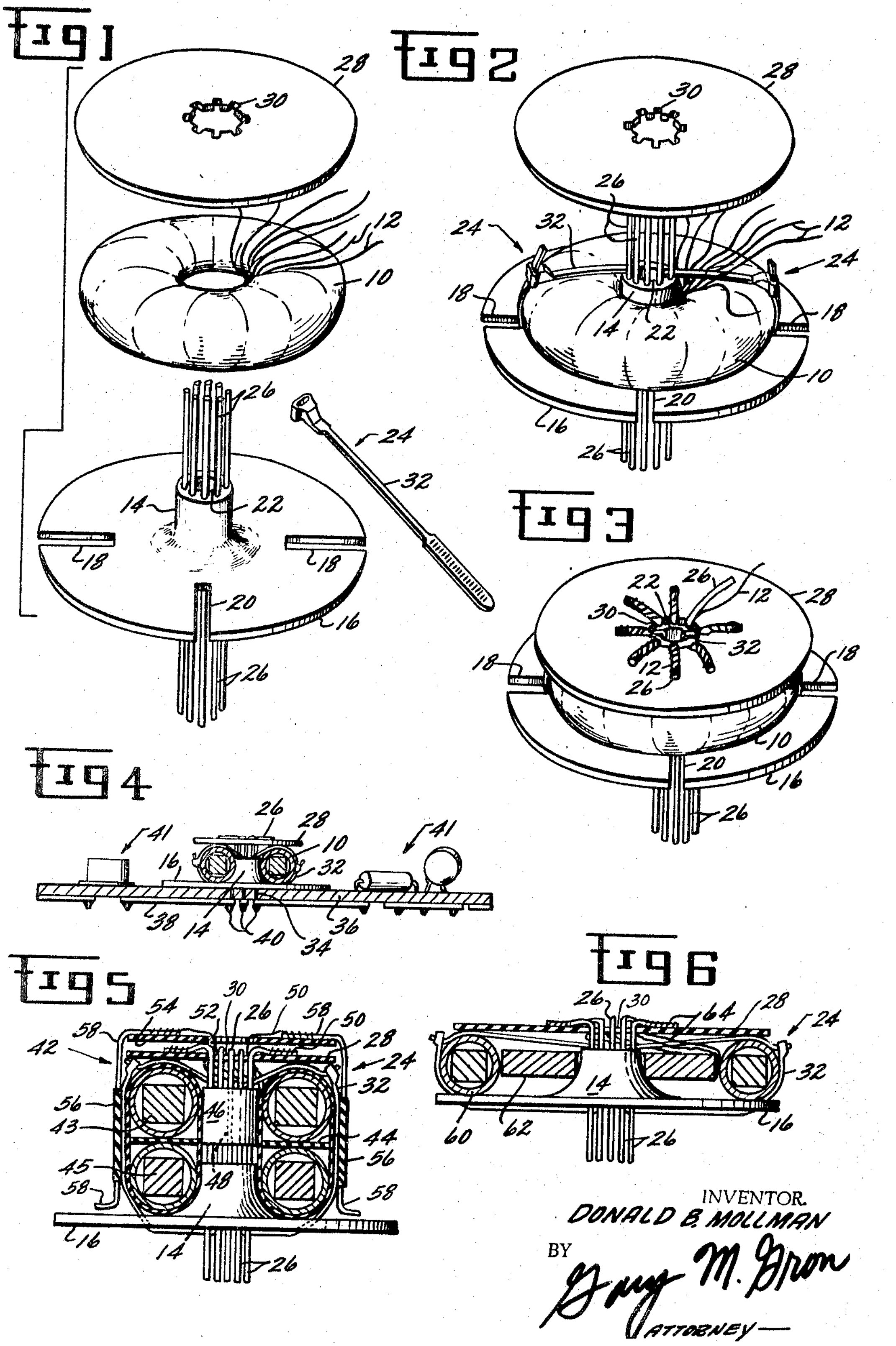
FIGURE 1 is an exploded perspective view of the components for a toroidal electrical component support apparatus embodying the present invention.
FIGURE 2 is a view of the support apparatus of FIGURE 1 in a partially assembled state.
FIGURE 3 is a view of the support apparatus of FIGURE 1 in a fully assembled condition.
FIGURE 4 is a view showing the connection of the toroidal electrical component support apparatus of FIGURE 1 to a printed circuit.
FIGURE 5 is a longitudinal view of a support apparatus embodying the present invention for use with a toroidal electrical component of substantial height.
FIGURE 6 illustrates another support apparatus embodying the present invention for use with a toroidal electrical component of substantial radial dimension.

Reference is now had to FIGURE 1 which illustrates the support apparatus used with a toroidal electrical component 10 which may be a toroidal magnetic core 10 having a plurality of relatively fine winding wires 12 extending therefrom. The winding wires are covered with a thin electrically insulating material to prevent short circuiting. The support apparatus comprises a generally cylindrical center body 14 of electrically insulating material which is sized to fit into the center of the toroidal magnetic core 10. A generally circular plate 16 is integral with and extends radially from one end of the center body 14. Two pairs of notches 18 and 20 of varying depths are provided in the generally circular plate 16. The center body 14 has a longitudinal passage 22 extending therethrough, through which an adjustable strap 24 extends to secure the toroidal magnetic core 10 to the center body 14 and the circular base plate 16.

A plurality of interconnecting wires 26 extend through the center body 14 and from opposite ends thereof. The interconnecting leads 26 are comprised of suitable electrically conductive wires which is larger in diameter and stiffer than the toroidal winding wires 12 to enable simplified connection with an electrical circuit. As herein illustrated, wires 26 are positioned in a circular pattern which is of a standard electrical configuration to facilitate registry with standard openings in a printed circuit board. As will later be shown, an insulating disc 28 is positioned over the top side of the toroidal magnetic core 10 so that the electrical leads 26 from the top side of the center body 14 extend through a notched opening 30.

The assembly of the support apparatus and the toroidal magnetic core 10 is accomplished by placing the toroidal magnetic core 10 over the center body 14 to rest on the circular plate 16. A pair of mounting straps 24 is then passed through the passageway 22 and through the appropriate notches 18 or 20, depending upon the radial width of the toroid 10 and tightened to secure the toroidal magnetic core 10 to the center body 14 as illustrated in FIGURE 2. It should be noted that the strap 24 has a reduced width center portion 32 which enables the strap to be fitted between adjacent electrical leads 26. With the toroidal magnetic core 10 mounted to the center body 14 to the two elements in rigid spaced relationship, the interconnecting wires 26 may be conveniently connected to the magnetic winding wires 12 as follows.

The insulating disc 28 is placed over the top side of the toroidal magnetic core 10 so that the wires 26 extend through the notched opening 30. The winding wires 12 from the toroidal core may also be passed through the opening 30. When the various wires are positioned to extend through the notched opening 30, the interconnecting leads 26 may be bent outwardly in the notches on the opening 30 to maintain the wires in a spaced apart relationship to prevent electrical shorting. The winding leads 12 may then be secured electrically connected to appropriate interconnecting leads 26 by soldering or other means. When the leads are to be soldered, the electrical insulation on the winding wires 12 at the connecting point is removed and the wires wrapped around the interconnecting leads 26 as illustrated in FIGURE 3. The joints are then soldered to provide an electrical connection therebetween.

It is also possible with the above arrangement to weld the winding leads 12 to the interconnecting leads 26 because the junctions between the wires are spaced apart and easily accessible on the top of the toroidal electrical component 10. If welding is used to connect the wires, it is generally not necessary to remove the insulation from the winding leads. The junction between is merely heated to melt or burn the insulation from the winding leads and then the winding leads 12 and the interconnecting leads 26 are connected by resistance welding or the like.

The toroidal magnetic core 10, in its assembled state, is then conventiently connected into a printed circuit as illustrated in FIGURE 4. It should be noted that the interconnecting wires 26 register with standard pin openings 34 in a printed circuit board 36. The wires 26 extend to electrically conductive material 38, such as copper, on the opposite side of the board. The wires 26 are then secured to the conductive material 38 by soldering and trimming the excess length of the wires to form a solder joint 40, as illustrated in FIGURE 4. The printed circuit board 38, along with other electrical components 41, may then be mounted as a completed assembly by encapsulation.

It should be noted that the circular plate 16 and the insulating discs 28 are appreciably larger in diameter than the toroidal electrical component 10. This is to permit the use of a standard size support apparatus to be used with toroidal electrical components of varying size. The manner in which the support apparatus is used for two sizes of toroidal components is illustrated in FIGURES 5 and 6.

Referring particularly to FIGURE 5, there is shown a toroidal electrical assembly 42 comprising a pair of toroidal magnetic cores 43, 45 stacked on top of one another and separated by an insulating plate 44. With this toroidal component, the center body 14 extends partially through the center of the toroidal electrical assembly 42. A cylindrical centerpiece 46 having openings 48 positioned to accept the leads 26 is positioned in the center of the toroid 42 between the center body 14 and the upper side of the assembly. The cylindrical element also has a longitudinal passageway, not shown, to permit passage of the straps 24 through the cylindrical element 46 and the center body 14 to secure the toroidal electrical assembly 42 thereto. The leads 26 and magnetic winding wires 50 of the toroidal component extend through the notched hole 30 of the insulating disc 28 for electrical connection as shown in FIGURE 3. However, the magnetic toroidal electrical assembly 42 generally has more magnetic winding leads 50 to be connected than can be accommodated by the standard eight wire configuration of the center body 14. In order to enable further connection with the electrical circuit, the surplus of the winding wires 50 are extended through the notched opening 30 in the disc 28 and through an opening 52 in second insulating disc 54 which is placed on top of the wires 26 and 50 joined on top of the disc 28. A band 56 of electrically insulating material is then wrapped around the outer periphery of the toroidal electrical component 42 and is secured thereto to hold band 56 in rigid relation to the toroidal component 42. A plurality of interconnecting electrically conductive wires 58 extend through the band 56 in a parallel spaced relationship. Again, these wires are relatively thicker than the magnetic winding wires 50 to enable a convenient connection with an electrical circuit. The upper ends of the wires 58 are then bent inwardly over the edges of the insulating disc 54 and are connected to the winding wire 50 of the toroidal magnetic core 42 in a manner similar to that of the connections shown in FIGURE 3.

Referring now to FIGURE 6, there is shown the use of the present invention for a toroidal magnetic core 60 having an interior dimension which is substantially larger than the diameter of the standard center body 14. In order to secure the toroid 60 to the center body 14, an annular spacing ring 62 is placed between the center body 14 and the interior wall of the toroid 60. This enables the toroid 60 to be securely held to the center body by the adjustable straps 24. The insulating disc 28 is then placed over the top and the wires 26 connected to winding wires 64 of the toroid in the fashion illustrated before.

It is apparent from the foregoing that the present invention provides a highly effective and positive electrical connection between the relatively thin and fragile windings of a magnetic toroidal core and an electrical circuit. By mounting the toroid to a center body having interconnecting wires integral therewith, the interconnecting wires 26 and the magnetic winding wires are held rigid relative to one another which minimizes movement of the joint. It is also apparent, by using the center body and the integrally formed interconnecting wires, that the electrical connections are greatly accessible. This is extremely important in miniaturized components because the accessibility is necessary to achieve consistently uniform joints on a mass production basis. As stated previouly, the accessibility of the joints enables the use of a welding process which greatly facilitates the mass production assembly of these types of components by eliminating the need for the cumbersome stripping of insulation from the magnetic winding wires.

The support apparatus as shown also has great utility in being utilized for various toroidal electrical component shape. It is apparent that a standard center body, circular plate and wires may be molded and used for diverse sizes of toroidal electrical components by utilizing the appropriate inserts. This enables a relatively low cost standard component to be custom tailored for use with a particular toroidal electrical component.

Another advantage accrues from the use of a standard support apparatus. It is obvious that with the standard eight pin circular arrangement of the interconnecting wires 26, the magnetic core windings may be evaluated for performance by using test equipment with standard receptacles.

While the above described invention has been discussed in relation to a toroidal magnetic core, it is apparent that equal advantages would be obtained in the support of any toroidal electrical component having relatively thin and fragile output leads. As such, modifications of the described embodiment may be apparent to those skilled in the art without departing from the spirit of the invention.

Accordingly, the scope of the invention is to be determined solely by the following claims.

Having described the invention, what is claimed as novel and desired to be secured by Letters Patent of the United States is:

1. In combination, a support apparatus and a toroidal electrical component having relatively thin electrical wires, said support apparatus comprising:
a center body of electrically insulating material disposed in thhe center of said toroidal component.
means for securing said toroidal electrical component to said center body,
a plurality of relatively thicker electrically conductive interconnecting wires extending through said center body and from both ends thereof in spaced apart relationship so that the interconnecting wires extending from one end of said center body may be connected to the relatively thin wires of the toroidal element and the wires from the opposite end may be connected to an electrical circuit,
whereby the interconnecting wires and the relatively thin wires of the toroidal electrical component are rigidly mounted relative to one another.

2. The combination in claim 1 wherein:
said center body further comprises a generally circular plate extending from one end of said center body so that one side of the toroidal component abuts the circular plate.
the free ends of said interconnecting wires extend from said generally circular plate in a predetermined spaced apart relationship for registry with connecting points in an electrical circuit.

3. Apparatus as in claim 2 wherein:
said center body has a longitudinal passageway therethrough,
said circular plate has a substantial radial dimension and has at least one radial notch therein,
said mounting means comprises,
adjustable strap means extending through said passageway and through said notch for holding said toroidal component to said center body and said circular plate,
whereby toroidal components of varying size may be mounted.

4. The combination in claim 3 further comprising:
generally circular disc of electrically insulating material positionable on the opposite side of said toroidal component,
said disc having an opening through which said interconnecting wires extend for bending radially outward to facilitate connection to said relatively thin wires of said toroidal component.

5. The combination in claim 4 wherein said toroidal electrical component has a plurality of relatively thin wires greater in number than the interconnecting wires extending from said center body and said apparatus further comprises:
a band of electrically insulating material extending around the outer periphery of and secured to said toroidal electrical component,
a plurality of electrically conductive relatively larger interconnecting wires extending through said band in spaced apart relationship,
a circular disc positioned on top of the wires joined on said first mentioned insulating disc,
whereby the remaining relatively thin wires of said toroidal electrical component may be connected to one end of the interconnecting wires extending from said band and the opposite ends of said wires may be connected to an electrical circuit.

6. The combination in claim 3 wherein:
said toroidal electrical component has such a height that said center body extends partially through the center of said toroidal component,
said apparatus further comprises a generally cylindrical element of electrically insulating material positioned in the interior of said toroidal component between the center body and the opposite side of said toroid,
said cylindrical element having a plurality of passageways through which said plurality of interconnecting wires extend for connection with said relatively thin wires,
said cylindrical element having a passageway in line with the longitudinal passageway of said center body whereby the adjustable strap means extends through both of said passageways to hold the toroidal electrical component to the center body.

7. The combination in claim 3 wherein:
said toroidal component has an interior dimension substantially larger than the width of said center body,
said apparatus further includes an annular spacing element positioned between the center body and the inside walls of said toroidal component,
whereby the toroidal component is securely fixed relative to said base element.

References Cited

UNITED STATES PATENTS

| | | | |
|---|---|---|---|
| 2,869,089 | 1/1959 | Hampel | 336—192 |
| 2,962,678 | 11/1960 | Gellert | 336—192 X |
| 2,953,758 | 9/1960 | Stanwyck | 336—208 X |
| 2,983,886 | 5/1961 | Heckler | 336—192 X |
| 3,046,452 | 7/1962 | Gellert. | |
| 3,070,766 | 12/1962 | Purdy | 336—199 X |

LEWIS H. MYERS, *Primary Examiner.*

E. A. GOLDBERG, *Assistant Examiner.*

U.S. Cl. X.R.

317—101; 336—68, 192, 208